(12) United States Patent
Eungard

(10) Patent No.: US 8,307,589 B2
(45) Date of Patent: Nov. 13, 2012

(54) SEGMENTED DOCK SEALS FOR TRUCK LOADING DOCKS AND ASSOCIATED SYSTEMS AND METHODS

(75) Inventor: William C. Eungard, Waterford, WI (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 0 days.

(21) Appl. No.: 13/346,894

(22) Filed: Jan. 10, 2012

(65) Prior Publication Data

US 2012/0102852 A1    May 3, 2012

Related U.S. Application Data

(62) Division of application No. 12/334,167, filed on Dec. 12, 2008, now Pat. No. 8,112,949.

(51) Int. Cl.
*E04B 1/62*   (2006.01)
(52) U.S. Cl. .................. 52/173.2; 52/173.1; 52/2.12
(58) Field of Classification Search .......... 52/2.12, 52/173.1, 173.2; 293/107, 108, 109; 428/158, 428/159, 160; 5/724
See application file for complete search history.

(56) References Cited

U.S. PATENT DOCUMENTS

| | | | |
|---|---|---|---|
| 2,704,574 A | 3/1955 | Etlar | |
| 3,181,205 A * | 5/1965 | Frommelt et al. | 52/173.2 |
| 3,230,675 A * | 1/1966 | Frommelt et al. | 52/173.2 |
| 3,286,417 A | 11/1966 | Dazzo | |
| 3,375,625 A | 4/1968 | Edkins et al. | |
| 3,403,489 A | 10/1968 | Frommelt et al. | |
| 3,461,627 A | 8/1969 | Conger | |
| 3,500,599 A | 3/1970 | Sciolino | |
| 3,613,324 A * | 10/1971 | Conger | 52/163 |
| 3,875,954 A | 4/1975 | Frommelt et al. | |
| 4,015,380 A * | 4/1977 | Chalfant | 52/173.2 |
| 4,038,792 A | 8/1977 | McGuire et al. | |
| 4,213,279 A | 7/1980 | Layne | |
| 4,286,410 A | 9/1981 | Hahn | |
| 4,293,969 A | 10/1981 | Frommelt | |
| 4,365,452 A | 12/1982 | Fillman et al. | |
| 4,381,631 A * | 5/1983 | Frommelt | 52/173.2 |
| 4,422,199 A | 12/1983 | Frommelt | |

(Continued)

FOREIGN PATENT DOCUMENTS

AU      2006230657      5/2007

(Continued)

OTHER PUBLICATIONS

4Front Engineered Solutions, Inc., DSH Series Dock Seals Installation Instructions, Form No. 4F-DSH-1/07.

(Continued)

*Primary Examiner* — Jeanette E Chapman
*Assistant Examiner* — James Buckle, Jr.
(74) *Attorney, Agent, or Firm* — Perkins Coie LLP

(57) ABSTRACT

Segmented dock seals for truck loading docks are described herein. An elongate, compressible pad member for use with a loading dock seal is positioned to compliantly conform to an aft end of a trailer positioned proximate to an opening in a building. The pad member includes a body portion having a front side and a back side. The body portion is composed of a compressible foam material. The pad member further includes a plurality of individual fingers projecting away from the front side of the body portion. The individual fingers are integral with the body portion and are spaced apart from each other.

13 Claims, 6 Drawing Sheets

U.S. PATENT DOCUMENTS

| | | | |
|---|---|---|---|
| 4,557,008 A | 12/1985 | Jurden | |
| 4,574,542 A | 3/1986 | Kleynjans | |
| 4,601,142 A | 7/1986 | Frommelt | |
| 4,636,423 A * | 1/1987 | Reid | 428/196 |
| 4,638,612 A | 1/1987 | Bennett | |
| 4,682,382 A | 7/1987 | Bennett | |
| 4,711,059 A | 12/1987 | Layne | |
| 4,716,697 A | 1/1988 | Snyder | |
| 4,718,207 A * | 1/1988 | Frommelt | 52/173.2 |
| 4,744,121 A | 5/1988 | Swessel et al. | |
| 4,799,342 A | 1/1989 | Klevnjans | |
| 4,805,362 A | 2/1989 | Frommelt et al. | |
| 4,821,468 A | 4/1989 | Moore | |
| 4,825,607 A | 5/1989 | Frommelt et al. | |
| 4,885,881 A | 12/1989 | Lenz | |
| 4,916,870 A | 4/1990 | Moore | |
| 5,001,799 A | 3/1991 | Alexander et al. | |
| 5,048,246 A | 9/1991 | Sullivan | |
| 5,088,143 A | 2/1992 | Alexander | |
| 5,125,196 A * | 6/1992 | Moody | 52/173.2 |
| 5,174,084 A | 12/1992 | Alten | |
| 5,185,977 A | 2/1993 | Brockman et al. | |
| 5,282,342 A | 2/1994 | Brockman et al. | |
| 5,313,681 A | 5/1994 | Alexander | |
| 5,333,424 A | 8/1994 | Chalfant et al. | |
| 5,394,662 A | 3/1995 | Giuliani et al. | |
| 5,396,676 A | 3/1995 | Alexander et al. | |
| 5,442,825 A | 8/1995 | Hahn et al. | |
| 5,473,846 A | 12/1995 | Giuliani et al. | |
| 5,475,888 A | 12/1995 | Massey | |
| 5,533,218 A | 7/1996 | Fahy | |
| 5,553,424 A | 9/1996 | Brockman et al. | |
| 5,622,016 A | 4/1997 | Frommelt et al. | |
| 5,675,945 A | 10/1997 | Giuliani et al. | |
| 5,775,044 A * | 7/1998 | Styba et al. | 52/173.2 |
| 5,953,868 A | 9/1999 | Giuliani et al. | |
| 5,996,291 A | 12/1999 | Styba et al. | |
| 6,014,844 A | 1/2000 | Thill | |
| 6,044,597 A * | 4/2000 | Droullard et al. | 52/173.2 |
| 6,073,402 A * | 6/2000 | Moody | 52/173.2 |
| 6,125,491 A | 10/2000 | Alexander | |
| 6,205,721 B1 | 3/2001 | Ashelin et al. | |
| 6,311,435 B1 | 11/2001 | Brockman et al. | |
| 6,374,554 B1 | 4/2002 | Eungard | |
| 6,399,189 B1 * | 6/2002 | Kobayashi et al. | 428/316.6 |
| 6,425,214 B1 | 7/2002 | Boffeli et al. | |
| 6,442,783 B1 | 9/2002 | Yoon et al. | |
| 6,502,268 B2 | 1/2003 | Ashelin et al. | |
| 6,654,976 B2 | 12/2003 | Digmann et al. | |
| 6,810,817 B1 | 11/2004 | James | |
| 6,854,224 B2 | 2/2005 | Thill et al. | |
| 6,948,285 B2 | 9/2005 | Miller et al. | |
| 7,146,673 B1 | 12/2006 | Digmann et al. | |
| 7,162,762 B1 | 1/2007 | Gleason | |
| 7,184,194 B2 | 2/2007 | Wood | |
| 7,230,819 B2 | 6/2007 | Muchow et al. | |
| 7,254,922 B2 | 8/2007 | Brockman et al. | |
| 7,287,353 B2 | 10/2007 | Thill et al. | |
| 7,334,281 B2 | 2/2008 | Digmann et al. | |
| 7,380,375 B2 * | 6/2008 | Maly | 52/173.1 |
| 7,383,664 B2 * | 6/2008 | Chalfant | 52/173.2 |
| 7,444,785 B2 | 11/2008 | Dillon et al. | |
| 7,584,517 B2 | 9/2009 | Digmann et al. | |
| 7,703,245 B2 * | 4/2010 | Chalfant | 52/173.2 |
| 7,757,442 B2 | 7/2010 | Hoffmann et al. | |
| 7,781,292 B2 | 8/2010 | Gambino et al. | |
| 7,861,762 B2 | 1/2011 | Meichtry | |
| 7,877,831 B2 | 2/2011 | Digmann et al. | |
| 7,891,400 B2 | 2/2011 | Meichtry | |
| 8,037,576 B2 | 10/2011 | Meichtry | |
| 8,112,949 B2 | 2/2012 | Eungard | |
| 8,132,280 B2 | 3/2012 | Gleason et al. | |
| 2002/0148177 A1 * | 10/2002 | DiBiase | 52/173.1 |
| 2003/0177720 A1 | 9/2003 | Hoffmann et al. | |
| 2003/0230033 A1 * | 12/2003 | Shelton | 52/173.2 |
| 2004/0123532 A1 * | 7/2004 | Thill et al. | 52/173.2 |
| 2004/0134139 A1 | 7/2004 | Busch et al. | |
| 2004/0261335 A1 | 12/2004 | Eungard | |
| 2005/0102929 A1 | 5/2005 | Hoffmann et al. | |
| 2005/0178077 A1 * | 8/2005 | Shelton | 52/173.2 |
| 2006/0026912 A1 | 2/2006 | Eungard et al. | |
| 2006/0032159 A1 | 2/2006 | Eungard et al. | |
| 2008/0047211 A1 * | 2/2008 | Hoffmann et al. | 52/309.9 |
| 2008/0052843 A1 | 3/2008 | Eungard et al. | |
| 2008/0104902 A1 * | 5/2008 | Ashelin et al. | 52/173.2 |
| 2008/0289270 A1 * | 11/2008 | Chalfant | 52/173.2 |
| 2009/0045649 A1 | 2/2009 | Eungard et al. | |
| 2009/0064605 A1 * | 3/2009 | Hoffman | 52/173.2 |
| 2009/0077906 A1 * | 3/2009 | Tramonte et al. | 52/173.2 |
| 2009/0133339 A1 * | 5/2009 | Carolan et al. | 52/173.1 |
| 2009/0293382 A1 * | 12/2009 | Digmann et al. | 52/173.2 |
| 2010/0186318 A1 | 7/2010 | Eungard | |
| 2010/0251639 A1 * | 10/2010 | Hoffmann et al. | 52/173.2 |
| 2010/0269427 A1 * | 10/2010 | Digmann et al. | 52/173.2 |
| 2010/0319143 A1 | 12/2010 | Wessel | |

FOREIGN PATENT DOCUMENTS

| | | |
|---|---|---|
| EP | 0173929 | 4/1987 |
| EP | 0477656 | 9/1991 |
| WO | WO9410073 | 5/1994 |
| WO | WO00/27734 | 5/2000 |
| WO | WO2006/052661 | 5/2006 |
| WO | WO2007056744 | 5/2007 |
| WO | WO2007076507 | 7/2007 |
| WO | WO2008/057682 | 5/2008 |
| WO | WO2009/032441 | 3/2009 |

OTHER PUBLICATIONS

4Front Engineered Solutions, Inc., Rear Hinge Installation Pub. No. AP5525 RA p. 3, Jun. 2011, 1 page.

4Front Engineered Solutions, Inc., DSHL Series Dock Seals Installation Instructions, Form No. 4F-DSHL-1/07.

4Front Engineered Solutions, Inc., VSH Series Dock Seals Installation Instructions, Form No. 4F-VSH-1/07.

4Front Engineered Solutions, Inc., DSS & WM Series Dock Seals Installation Instructions, Form No. 4F-DSS-1/07.

Dock Leveler Weatherseals, Rite Hite Corp., 2008, 3 pages.

Drawing No. 707-312 Rear Hinge w/s Assembly, Kelly Company, Inc., Nov. 15, 2008.

Series 1600 WeatherGuard Header Seals, Fairborn USA Inc., 2 pages, 2004.

Frommelt Eliminator II Series Soft-Sided Shelters, Frommelt Products Corporation, 6 pages, 2002.

Frommelt Insulator Dock Sealing System, Frommelt Products Corporation, 4 pages, 2001.

Frommelt PitMaster Under-Leveler Seal, Rite Hite Corp., 2008; 2 pages.

Frommelt VHLS Vertical Under-leveler Seal, Installation Instructions, Frommelt Products Corporation, Pub. No. VHLS-0003, May 2007, 16 pages.

Frommelt VHL Under-leveler Seal (Model VHLS), Architectural Specifications, 2 pages.

Frommelt VHLS Under-leveler Seal for Vertical Hydraulic Leveler, Rite-Hite Holding Corporation, [Internet accessed Aug. 28, 2007] 1 page.

Kelley aFX/aFX-S Dock Leveler Safe T Frame, User's Manual, Installation, Operations, Maintenance and Parts, 4Front Engineered Solutions, Inc., 2008.

Kelley DSS Series Dock Seal With Stationary Head Pad, Kelley Dock Seals, 4Front Engineered Solutions 2007.

Kelley Weatherseal Installation Instructions '4 Series' Dockboard, Kelley Company, Inc., Doc. No. 5164, Mar. 2, 1981; 2 pages.

Kelley Weatherseal Installation, Kelley Company, Inc., Doc. No. 5141, Aug. 2, 1978; 1 page.

Non-Final Office Action; Jun. 9, 2011; U.S. Appl. No. 12/334,167; 15 pages.

* cited by examiner

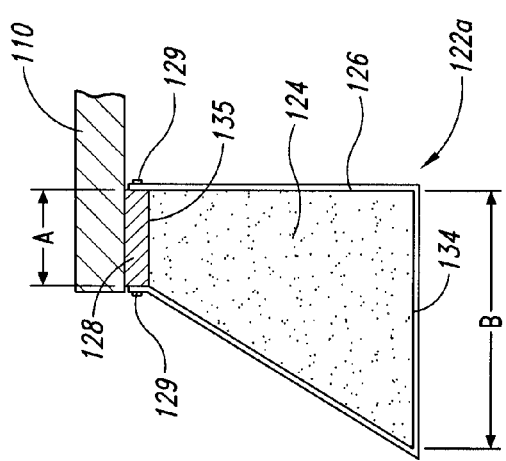
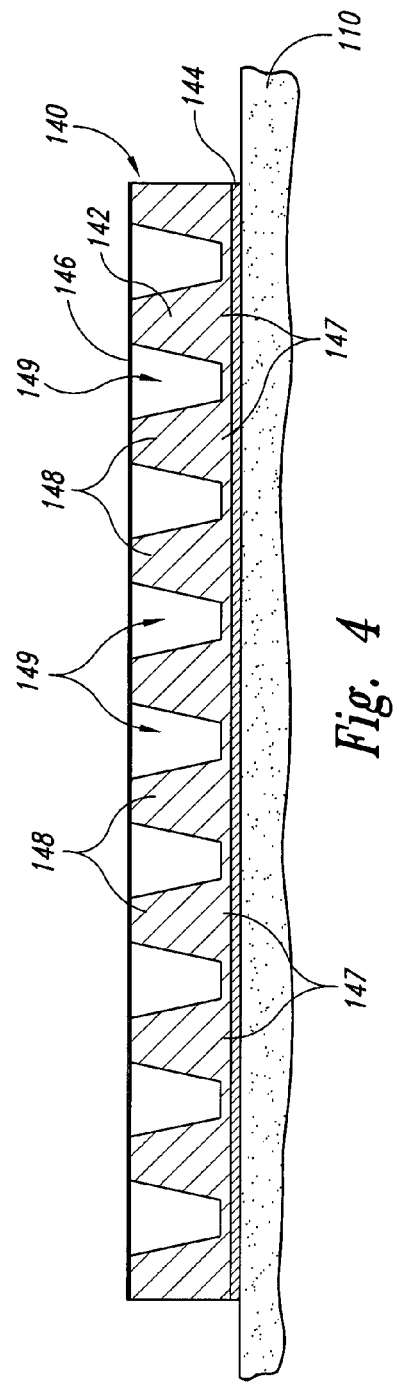

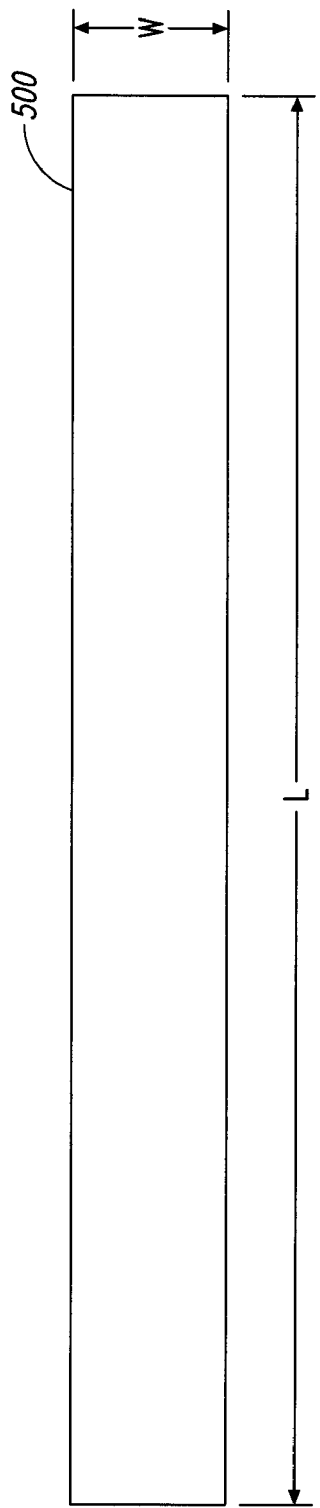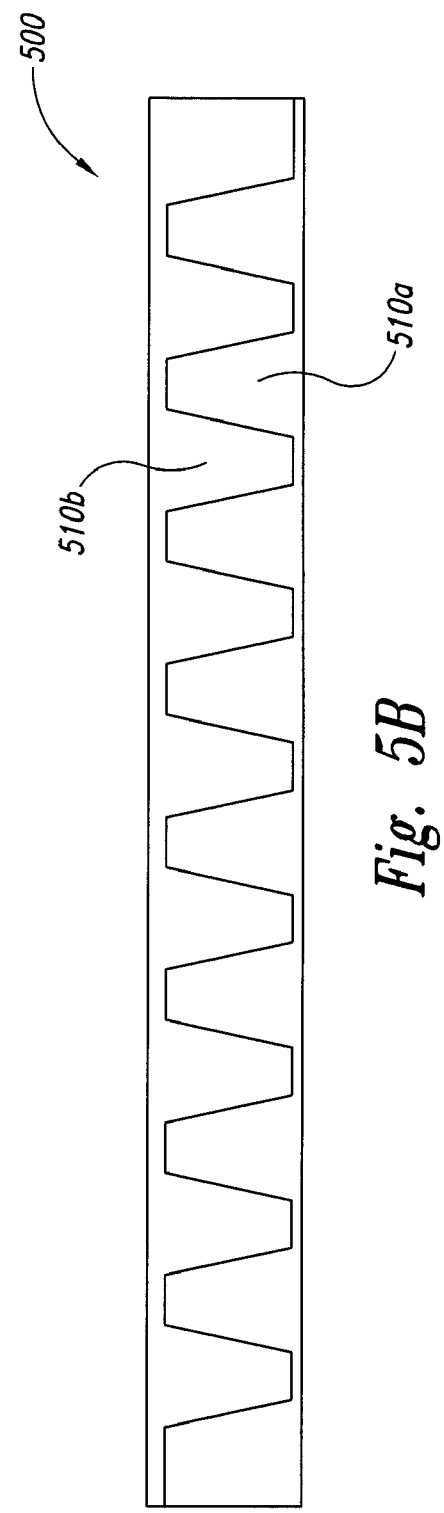
Fig. 5A
Fig. 5B

SEGMENTED DOCK SEALS FOR TRUCK LOADING DOCKS AND ASSOCIATED SYSTEMS AND METHODS

TECHNICAL FIELD

The present disclosure relates generally to dock seals that provide a seal between a shipping trailer and a loading dock, and associated systems and methods.

BACKGROUND

Warehouses typically include one or more loading docks for transferring goods to and from over road trailers. Conventional loading docks usually consist of an opening in a side of the warehouse. The opening is typically covered by a roll up door, and is usually positioned a few feet above the ground to be approximately level with shipping trailers. To load or unload goods, the doors on an aft end of the trailer are opened and the trailer is backed up to the loading dock opening. Workers can then pass into the trailer through the opening to load or unload goods.

There are various types of loading dock enclosures that are used for sheltering and/or sealing the open end of the trailer during the loading and unloading process. Such shelters are described in, for example, U.S. Pat. Nos. 4,213,279; 4,601,142; 4,711,059; 4,718,207; 4,799,342; 4,885,881; 5,282,384; 5,953,868; and 6,311,435; U.S. Patent Publication Nos. 2003/0177720; and 2004/0134139; and International Patent Publication No. WO 2006/052661. Each of the aforementioned patents and patent applications are incorporated into the present disclosure in its entirety by reference.

Many conventional loading dock seals comprise resilient, compressible pads that are attached to the building along the lateral and top edges of the doorway. The pads usually include a foam core, which is covered with a coated vinyl fabric or other similar covering for protection and appearance. The pad compliantly conforms to the rear contour of the aft end of the trailer as the trailer presses up against the pad, which helps seal the gap between the face of the building and the trailer. Although dock seals provide excellent sealing, they are often subject to significant compressive forces that can shorten the life of the seal. For example, as the trailer engages the dock seal, the fabric cover of the dock seal is subjected to compressive forces between the trailer and the pad, and the fabric cover can be punctured or otherwise damaged. Moreover, as the trailer moves up and down during loading/unloading, abrasive forces can also wear through the fabric cover. When the fabric becomes punctured, the foam core can become exposed and damaged. As a result, the dock seals may require relatively frequent repair or replacement.

BRIEF DESCRIPTION OF THE DRAWINGS

FIG. 3 is a partially schematic, cross-sectional top view of a portion of a side member of the loading dock seal of FIG. 1.

FIG. 4 is a partially schematic, cross-sectional top view of a head member of the loading dock seal of FIG. 1.

FIGS. 5A-5C illustrate various stages of a method for forming a segmented dock seal in accordance with an embodiment of the disclosure.

DETAILED DESCRIPTION

The following disclosure describes various embodiments of segmented dock seals for truck loading docks and associated systems and methods. In one embodiment, for example, a loading dock includes compressible foam side members and a head member that seal against the sides and top, respectively, of a docked trailer. The foam side and head members can each include a plurality of discrete segments or fingers projecting from a body portion and positioned to compress against the docked trailer.

Certain details are set forth in the following description and in FIGS. 1-6B to provide a thorough understanding of various embodiments of the disclosure. Other details describing well-known structures and systems often associated with truck loading dock seals and enclosures, however, have not been set forth in the following disclosure to avoid unnecessarily obscuring the description of the various embodiments of the disclosure.

Many of the details, dimensions, angles and other features shown in the Figures are merely illustrative of particular embodiments of the disclosure. Accordingly, other embodiments can have other details, dimensions, angles and features without departing from the spirit or scope of the present disclosure. In addition, those of ordinary skill in the art will appreciate that further embodiments of the disclosure can be practiced without several of the details described below.

In the Figures, identical reference numbers identify identical or at least generally similar elements. To facilitate the discussion of any particular element, the most significant digit or digits of any referenced number refer to the Figure in which that element is first introduced. For example, element 110 is first introduced and discussed with reference to FIG. 1.

Figure 1:
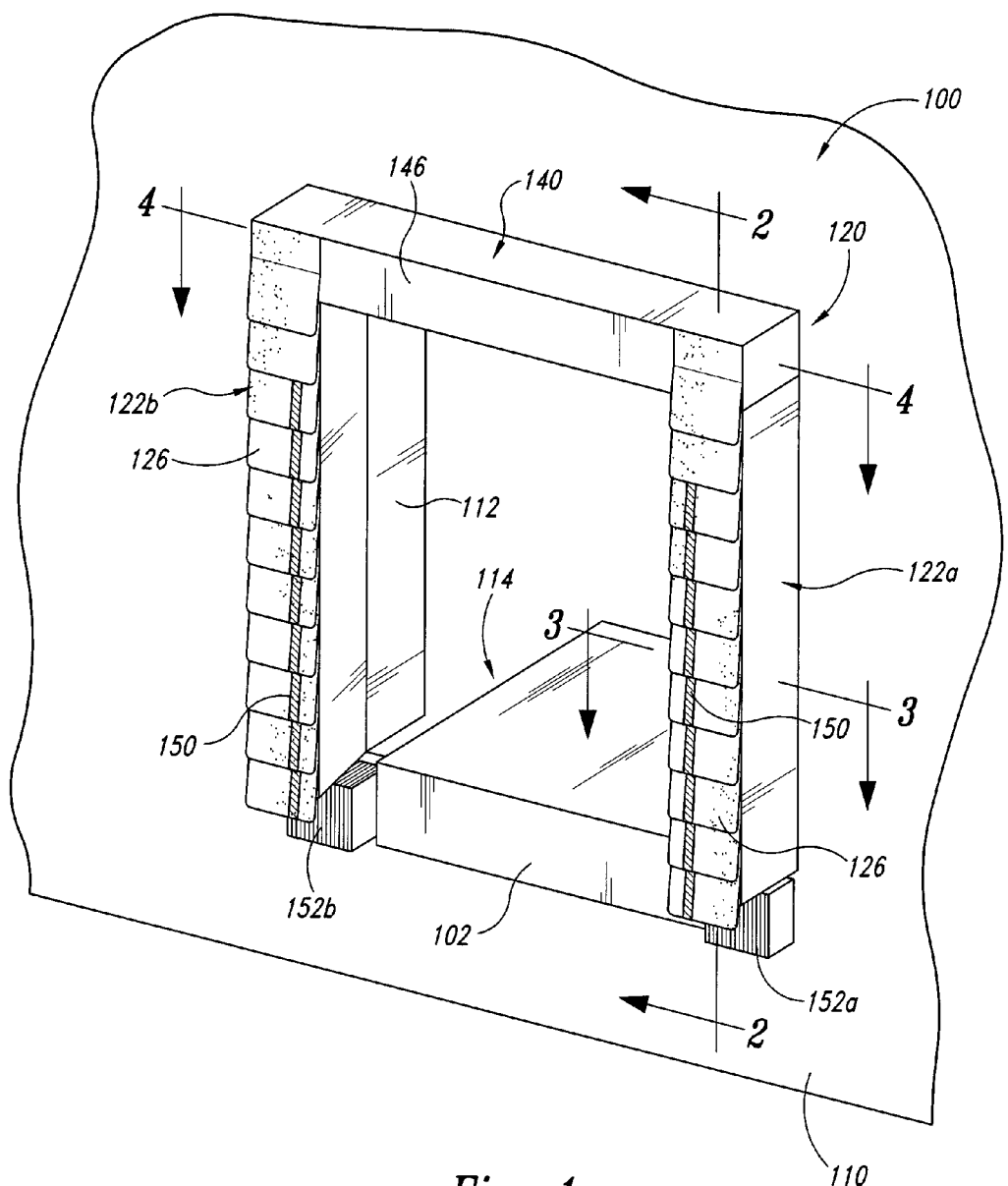
FIG. 1 is a partially schematic, isometric view illustrating a loading dock including a dock seal configured in accordance with an embodiment of the disclosure.
Figure 2:
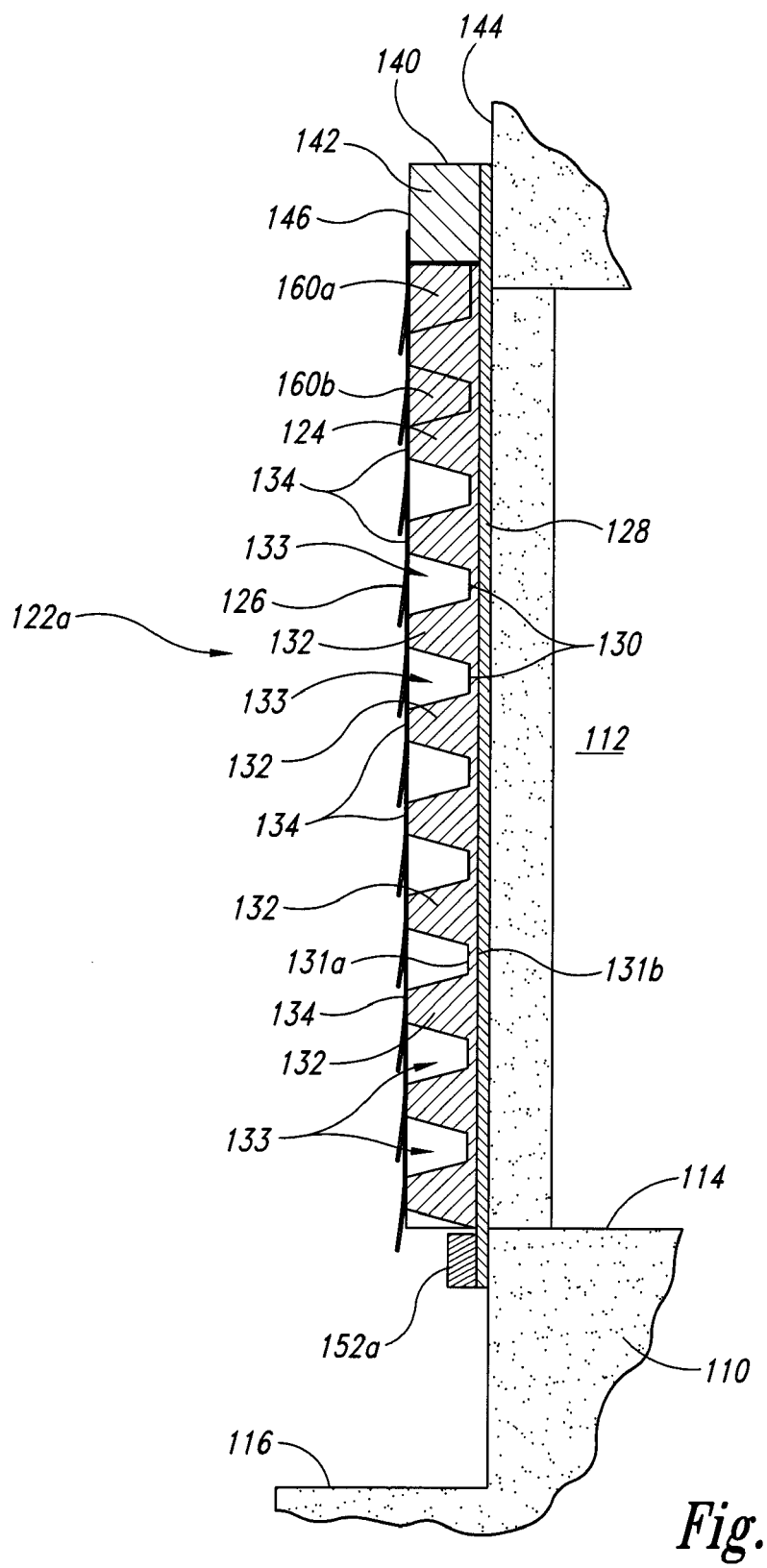
FIG. 2 is a partially schematic, cross-sectional side view of the loading dock seal of FIG. 1.

FIG. 1 is a partially schematic, isometric view of a loading dock 100 including a dock seal 120 configured in accordance with an embodiment of the disclosure. FIG. 2 is a partially schematic, cross-sectional side view of the loading dock 100 taken substantially along line 2-2 of FIG. 1, and FIG. 3 is a partially schematic, cross-sectional top view of the loading dock 100 taken substantially along line 3-3 of FIG. 1. Referring to FIGS. 1-3 together, the dock seal 120 is positioned around an opening 112 in a warehouse or other building 110. The opening 112 can be at least generally similar to a conventional trailer truck opening having a width of approximately 8 feet and a height of approximately 9 feet. In other embodiments, however, the opening 112 can have different dimensions. In this example, the loading dock 100 includes a conventional dock leveler 102 configured to provide an adjustable height path or bridge between a floor 114 in the building 110 and a bed of a trailer (not shown), vehicle, etc. at the dock 100.

The dock seal 120 includes side pad members 122 and a head pad member 140 positioned to seal along the side and upper edges, respectively, of a rear portion of a vehicle in contact with the dock seal 120. More specifically, the dock seal 120 includes a first side member 122a extending vertically along a first side portion of the opening 112, and a second side member 122b extending vertically along a second side portion of the opening 112 opposite to the first side portion. The head member 140 extends horizontally across a top portion of the opening 112 between the first side member 122a and the second side member 122b. The side members 122 and the head member 140 can be manufactured from a compressible material having a plurality of discrete segments or fingers projecting from a body portion and positioned to engage the rear portion of the vehicle (not shown). Further details regarding the segmented side members 122 and head member 140 are described below.

The first and second side members 122a and 122b are right-hand and left-hand versions of each other. For purposes of discussion herein, various side member embodiments will be described and illustrated with reference to a right side member (e.g., the first side member 122a). It will be appreciated, however, that a left side member (e.g., the second side member 122b) can have identical or at least generally identical features, and descriptions of the right side member can apply equally to the left side member.

As best seen in FIGS. 2 and 3, the side member 122a includes a resilient, compressible core material 124 covered by a durable covering 126 (e.g., a fabric covering). In one embodiment, the compressible core material 124 can include compressible foam or material (e.g., polyurethane foam) bonded or otherwise attached to an elongate support member 128. One advantage of using foam for the head and side members is it can be impacted by a misaligned trailer and will return to its original shape after the trailer is repositioned without having sustained significant damage.

The support member 128 can be made from treated wood, galvanized steel, extruded plastic, and/or other suitable materials known in the art. In one embodiment, the fabric covering 126 can be made from a Hypalon®, polyurethane, neoprene, or vinyl-coated fabric, such as commercially available vinyl-coated polyester fabric having sufficient strength, durability, manufacturability, cost, and/or other characteristics. In other embodiments, however, the covering 126 can be made from other suitable materials, or it can be omitted if the underlying core material 124 is sufficiently durable by itself. The covering 126 can be releasably secured to the support member 128 with conventional fasteners 129 (e.g., nails, screws, adhesive, stitches, staples, etc.).

The side member 122a further includes a body or base portion 130 having a front side 131a, a back side 131b opposite the front side 131a, and a plurality of discrete fingers or segments 132 projecting from the front side 131a. The fingers or segments 132 are separated from each other by gaps or channels 133. In the illustrated embodiment, the body portion 130 and fingers 132 are integral with each other and form a single, unitary structure composed of the same material (e.g., foam). In other embodiments, however, the body portion 130 and fingers 132 may not be integral components. For example, the fingers 132 may be separate components that are individually attached to the body portion 130 or the support member 128.

The fingers 132 each include a front face or tip 134 that faces away from the support member 128 and a rear face 135 that faces the support member 128. The front faces 134 of the individual fingers 132 are positioned to contact the rear portion of a vehicle at the dock 100. In one aspect of this embodiment, the front faces 134 of each of the fingers 132 are approximately co-planar with each other. As best seen in FIG. 3, the side member 122a in the illustrated embodiment has a beveled or trapezoidal cross-sectional shape with a relatively smaller rear dimension A (e.g., from 6-12 inches) at the support member 128, and tapering outwardly to a larger front or face dimension B (e.g., from 12-18 inches). In other embodiments, however, the side member 122a can have a generally rectangular cross-sectional shape with at least approximately equal front and rear dimensions (e.g., from approximately 6 inches to approximately 12 inches). In still other embodiments, the side member 122a can have variable depths and lengths depending upon the particular application. Moreover, the side member 122a can have other shapes (e.g., non-beveled, tapering inwardly as they move outwardly, etc.), sizes, and/or orientations to accommodate particular buildings, door openings, driveway inclinations, etc.

Referring back to FIGS. 2 and 3 together, the total number of fingers 132 for the side member 122a can vary depending upon the size of the side member 122a, the particular application in which the side member 122a is to be used, and a number of other factors. In one particular embodiment, for example, the front face 134 of each finger 132 can have a vertical dimension of approximately 2-6 inches, e.g., about 4 inches, and the gap 133 between the individual front faces 134 can have a dimension of approximately 6-12 inches, e.g., about 8 inches. In other embodiments, however, the front faces 134 and/or the gaps 133 can have different dimensions and/or different arrangements to suit particular requirements. Moreover, in still other embodiments, one or more fingers 132 may have different dimensions than the other fingers 132 of the side member 122a.

In one particular aspect of this embodiment, one or more support pieces 160 (two are shown as a first support piece 160a and a second support piece 160b) can be installed with the segmented side member 122a. The first and second support pieces 160a and 160b in the illustrated embodiment, for example, are positioned in the gaps 133 between the individual fingers 132 proximate to an upper portion of the side member 122a. The first and second support pieces 160a and 160b are positioned to help the side member 122a support the weight of the covering or an upper support member of a dock seal (e.g., a compressible head member, a hood, or another suitable upper support member). The first and second support pieces 160a and 160b may be composed of the same compressible foam or material as the core material 124, or the support pieces 160 can be composed of different materials. In other embodiments, the side member 122a can include a different number of support pieces 160 and/or the support pieces 160 may have a different arrangement. In still other embodiments, the support pieces 160 may be omitted.

In several embodiments, one or more fingers 132 can be fixedly attached to the covering 126. For example, the front face 134 of each finger 132 can be adhesively attached to the covering 126. This feature is expected to minimize and/or inhibit the fingers 132 from rotating or moving relative to the covering 126 during operation. In other embodiments, the front faces 134 can be attached to the covering 126 using other types of permanent and temporary fastening systems including, for example, adhesives, metallic fasteners, removable hook-and-loop systems (e.g., Velcro®), and/or other suitable attachment methods known in the art. In still other embodiments, however, the fingers 132 may not be fixedly attached to the covering 126.

Referring back to FIGS. 1 and 2 together, the head member 140 includes a resilient and compressible core material 142 bonded or otherwise attached to an elongate support member 144. As described in greater detail below with reference to FIG. 4, the head member 140 can also include a segmented pad member. The core material 142 can include compressible foam or material (e.g., polyurethane foam), and the support member 144 can include an elongate piece of treated wood, galvanized steel, extruded plastic, and/or other suitable materials known in the art. The head member 140 can also include a removable, durable fabric top covering 146 installed over the compressible core material 142. The top covering 146 can be composed of material(s) identical to or generally similar to the covering 126 on the side member 122a. In other embodiments, however, the top covering 146 can be made from other suitable materials, or it may be omitted.

FIG. 4 is a partially schematic, cross-sectional top view of the head member 140 of the loading dock 100 taken substantially along lines 4-4 of FIG. 1. The head member 140 can have a segmented configuration generally similar to the segmented side member 122a described above with reference to FIG. 2. For example, the head member 140 includes a body or base portion 147 and a plurality of discrete fingers or segments 148 integral with and projecting from a front side of the body portion 147. The individual fingers 148 are separated from each other by a gap or channel 149. In other embodiments, however, the body portion 147 and the fingers 148 may not be integral components.

In the illustrated embodiment, each finger 148 has a beveled cross-sectional shape with a relatively larger rear dimension at the support member 144, and tapering outwardly to a smaller front or face dimension. In other embodiments, however, the fingers 148 can have a generally rectangular cross-sectional shape with at least approximately equal front and rear dimensions. In still other embodiments, the fingers 148 can have other shapes and/or configurations. Moreover, as with the fingers 132, the fingers 148 of the head member 140 may be fixedly attached to the top covering 146 using suitable attachment methods, such as those described previously. The segmented configuration of the head member 140 is optional. In other embodiments, the head member 140 may have a generally rectangular, non-segmented profile rather than the segmented configuration described above.

Referring back to FIG. 1, the loading dock 100 can include several other features. For example, the side members 122 can include one or more visual references or guides 150 to help the driver align the trailer as she backs into the loading dock 100. In the illustrated embodiment, the visual guides 150 include stripes of reflective and/or brightly colored material positioned where the trailer should contact the side members 122. In other embodiments, however, the visual guides 150 can include other forms of visual reference marks. The visual guides 150 are optional features that may not be included in some embodiments.

The loading dock 100 can also include bumpers 152 (two are shown as a first bumper 152a and a second bumper 152b) attached to the building 110 proximate to the lower corners of the opening 112. The bumpers 152a and 152b help absorb the impact from shipping trailers as they back into the loading dock 100. In the illustrated embodiment, the opening 112 can be positioned at a height of from about 46 inches to about 54 inches above a driveway 116. The driveway 116 can have a grade of from about 0% to about ±4%.

Compared with conventional dock seals, the segmented configuration of the compressible core material within the side members 122 and the head member 140, respectively, is expected to result in lower compressive forces between the rear portion of a vehicle and the dock seal 120. This feature is accordingly expected to reduce the likelihood that the fabric coverings 126 and 146 of the side members 122 and the head member 140, respectively, will be punctured and can minimize the abrasive wear on the fabric coverings.

Another feature of the segmented side members 122 and head member 140 is that the individual fingers or segments of the pads are spaced apart from each other in such a way as to allow comb-like movement as the rear portion of a vehicle engaged with the dock seal 120 moves up and/or down. This feature is expected to reduce abrasive wear on the fabric coverings 126 and 146 as compared with conventional, non-segmented dock seals. Another advantage of having the individual fingers or segments at the front portion of the pad is that the fingers can conform more easily to irregular surfaces (e.g., hinges, handles, etc.) at the rear portion of the vehicle. The geometry of the fingers or segments allow the individual fingers to deflect more easily toward the rear or back portion of the dock seal 120, and thereby significantly decreases the likelihood of puncture of the fabric coverings 126 and 146 as compared with conventional dock seals.

Still another feature of the segmented side members 122 is that because material is removed from the front side of the side members, 122, the center of gravity of each side member 122 is closer to a rear or back portion of the side member 122. This feature is expected to help prevent sagging of the front or face portions 134 of the individual fingers or segments 132. Yet another feature of the segmented side members 122 and head member 140 is that the gaps between the respective fingers or segments allow air to easily flow around the various portions of the dock seal 120. This feature is expected to help keep the dock seal 120 dry and can minimize problems and damage associated with moisture within the various pad members of the dock seal 120.

Figure 5C:
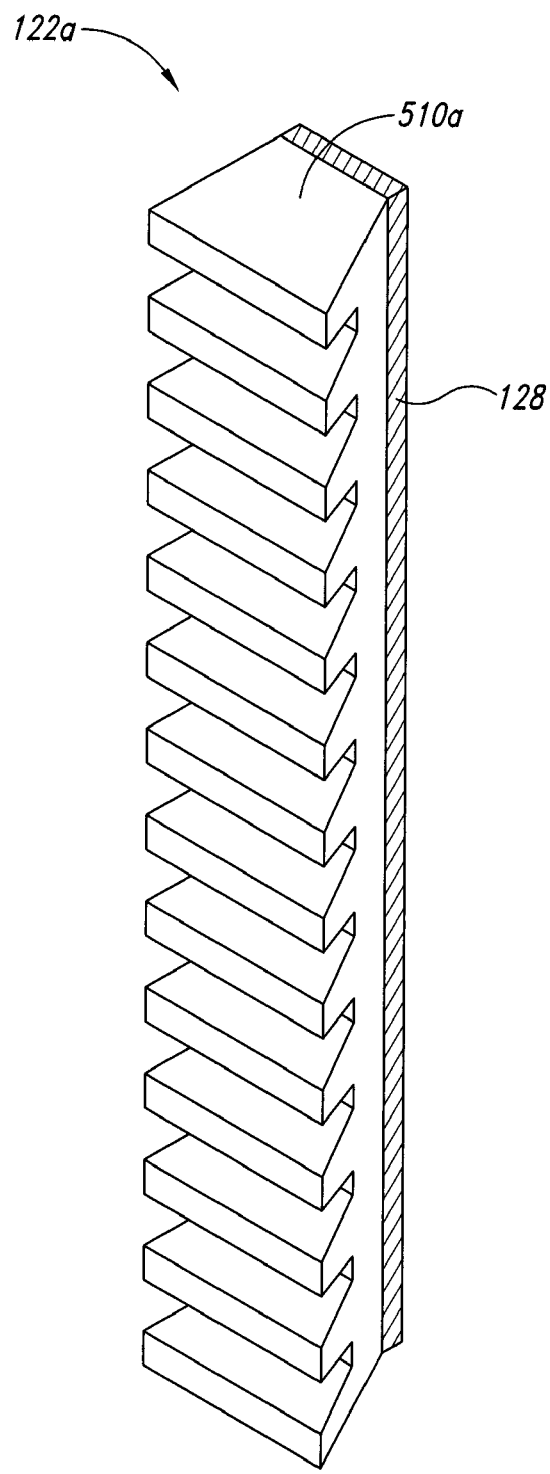

FIGS. 5A-5C illustrate various stages of a method for forming one embodiment of the segmented side members 122 of FIGS. 1-3. FIG. 5A, more specifically, is a schematic, top view of a compressible foam material 500 (e.g., polyurethane foam) at an initial stage of this process before fabrication. The foam material 500 has a generally rectangular, cross-sectional profile with a desired length L and width W. In one particular aspect of this embodiment, the width W of the foam material 500 can be significantly less than the width of a foam material necessary to construct a conventional dock seal. For example, the foam material 500 can have a width W of from approximately 8-15 inches, e.g., about 11.5 inches. In contrast, many conventional dock seals require foam material having a width of approximately 21 inches or more.

Referring next to FIG. 5B, the foam material 500 is patterned and cut to form segmented pads 510a and 510b for use with the first (i.e., right) and second (i.e., left) side members 122a and 122b. In the illustrated embodiments, the segmented pads 510a-b are mirror images of each other and can be cut from the single piece of foam material 500. The foam material 500 can be cut using a Computer Numerical Control (CNC) machine or another suitable device. FIG. 5C is an isometric view of one of the segmented pads 510 (e.g., the first pad 510a) after the pads are separated from each other and the pad has been attached to the support member 128. In other embodiments, the segmented pads 510 can have a different configuration and/or different features. It will be appreciated that the head member 140 of FIGS. 1-4 can be fabricated using identical or similar processes to those described above with reference to FIGS. 5A-5C.

One feature of the dock seal 120 of FIG. 1 and the method described above with reference to FIGS. 5A-5C is that the left side and right side members can be formed from a single piece of foam material 500. This feature is expected to significantly reduce manufacturing costs as compared with conventional, non-segmented dock seals. Moreover, shipping costs for the segmented dock seal 120 are expected to be significantly less the shipping costs for conventional dock seals because the individual left and right segmented pad components can be nested back together for shipping, thereby reducing the space required to ship the dock components.

Still another feature of the method described above is that the individual components (the foam material 500, the segmented pads 510a and 510b, etc.) are smaller than the components of many conventional docks and, accordingly, significantly lighter than such conventional components. This feature is expected to help ease the manufacturing process and mitigate the risks associated with injuries to personnel as a result of lifting and manipulating large, bulky components. In addition, the covering 126 is expected to be easier to install with the segmented side members 122 and head member 140 as compared with conventional, generally rectangular pads. This feature can reduce the time and costs associated with installation of the dock seal 120.

Figures 6A, 6B:
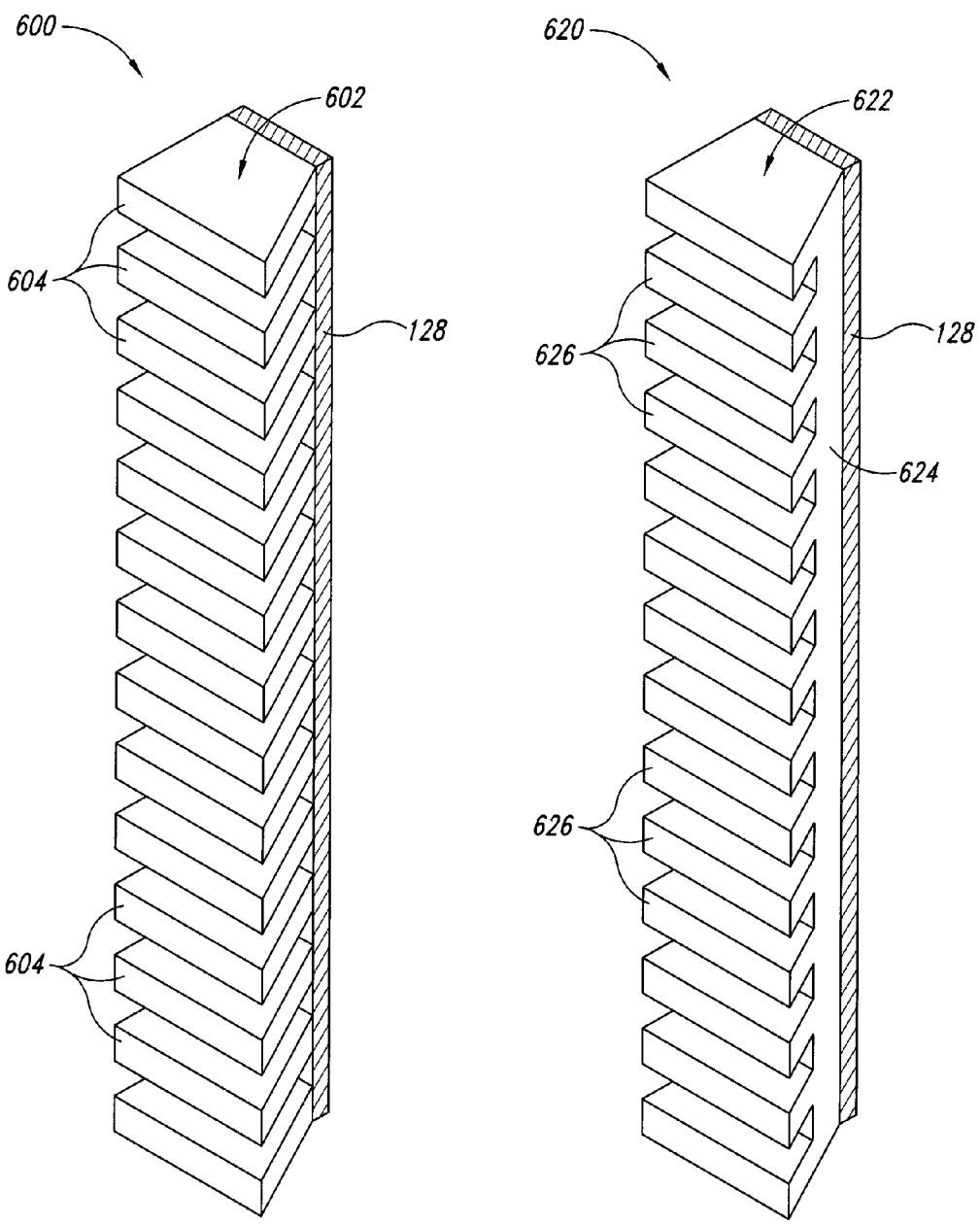
FIG. 6A is a partially schematic, isometric illustration of a segmented dock seal configured in accordance with another embodiment of the disclosure.
FIG. 6B is a partially schematic, isometric illustration of a segmented dock seal configured in accordance with still another embodiment of the disclosure.

FIGS. 6A and 6B are partially schematic, isometric view of side members 600 and 620 configured in accordance with additional embodiments of the disclosure. For purposes of illustration, the side members 600 and 620 are shown before installation of a fabric covering. The side members 600 and 620 include several features generally similar to the side members 122 and, accordingly, like reference numbers refer to like features. In addition, the side members 600 and 620 can be composed of materials generally similar to the materials described above with reference to FIGS. 1-5C. Further, the side members 600 and 620 can have many of the same features and advantages as the side members 122 described previously.

Referring first to FIG. 6A, for example, the side member 600 includes a resilient, compressible core material 602 attached to the support member 128. The side member 600 differs from the side members 122 described above, however, in that the core material 602 has a different segmented arrangement than the side members 122. More specifically, the core material 602 includes a plurality of discrete fingers or segments 604 projecting directly from the support member 128. The core material 602 of the side member 600, however, does not include a base or body portion between the fingers 604 and the support member 128.

Referring next to FIG. 6B, the side member 620 also includes a resilient, compressible core material 622 attached to the support member 128. The core material 622 in this embodiment differs from the side members 122 and 600 described above in that the segmented portions are not beveled. Rather, the core material 622 includes a body or base portion 624 and a plurality of discrete fingers or segments 626 having a generally rectangular configuration.

From the foregoing, it will be appreciated that specific embodiments have been described herein for purposes of illustration, but that the disclosure encompasses additional embodiments as well. For example, the segmented side members 122, 600, 620, and/or the head member 140 described above with reference to FIGS. 1-6B may have different configurations and/or include different features. In several embodiments, for example, the segmented pad members in any of the foregoing embodiments may have a different shape or different dimensions (e.g., segments arranged vertically or on a diagonal). In still other embodiments, the fingers or segments of the individual segmented pad members described above may be composed of materials other than foam. For example, the fingers may be composed of rubber, an elastomer material, or another suitable resilient, compressible material. In yet other embodiments, the dock seal 120 can include a hood or another suitable upper support member in lieu of the head member 140.

Specific elements of any of the foregoing embodiments can be combined or substituted for elements in other embodiments. For example, the side members 600 and/or 620 may be used with the loading dock 100. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Accordingly, the disclosure is not limited, except as by the appended claims.

I claim:

1. An apparatus for forming at least a partial seal between an open end of an over road trailer and an opening in a building, the apparatus comprising:
    a first side member configured to extend vertically adjacent to a first side portion of the door opening, wherein the first side member includes a first compressible foam portion covered by a first fabric portion, and wherein the first foam portion includes—
        a plurality of first segments having front faces and back faces opposite the front faces, wherein the back faces of the first segments are fixedly attached to and projecting away from a first generally rigid base portion, wherein the individual first segments are separated and spaced apart from each other and are fixedly attached to the first base portion such that a section of the first base portion is exposed between each of individual first segments,
        wherein the first fabric portion is in direct contact with and covering the front faces of the first segments;
    a second side member configured to extend vertically adjacent to a second side portion of the door opening opposite to the first side portion of the door opening, wherein the second side member includes a second compressible foam portion covered by a second fabric portion, and wherein the second foam portion includes—
        a plurality of second segments having front faces and back faces opposite the front faces, wherein the back faces of the second segments are fixedly attached to and projecting away from a second generally rigid base portion,
        wherein the individual second segments are separated and spaced apart from each other and are fixedly attached to the second base portion such that a section of the second base portion is exposed between each of the individual second segments,
        wherein the second fabric portion is in direct contact with and covering the front faces of the second segments; and
    a head member configured to extend horizontally adjacent to an upper portion of the door opening between the first and second side members.

2. The apparatus of claim 1 wherein the head member includes a third compressible foam portion covered by a third fabric portion, and wherein the third compressible foam portion comprises a third base portion and a plurality of third segments spaced apart from each other and projecting away from the third base portion.

3. The apparatus of claim 1 wherein the front faces of the first and second segments have vertical dimensions of approximately 4 inches, and further wherein the individual first segments and individual second segments are each spaced apart from each other by a channel having a dimension of approximately 8 inches.

4. The apparatus of claim 1 wherein:
    one or more front faces of the individual first segments are fixedly attached to the first fabric portion; and
    one or more front faces of the individual second segments are fixedly attached to the second fabric portion.

5. The apparatus of claim 4 wherein the front faces of the first segments and the front faces of the second segments are fixedly attached to the first and second fabric portions, respectively, with an adhesive material, a removable hook-and-loop system, and/or a mechanical fastener.

6. The apparatus of claim 1 wherein the first and second side members each include a first end portion proximate to an upper portion of the opening and a second end portion opposite the first end, and wherein the apparatus further comprises:
- one or more first support members releasably secured to the first foam portion proximate to the first end portion of the first side member, wherein each first support member is positioned in a channel between adjacent first segments proximate to the first end portion of the first side member; and
- one or more second support members releasably secured to the second foam portion proximate to the second end portion of the second side member, wherein each second support member is positioned in a channel between adjacent second segments proximate to the first end portion of the second side member.

7. The apparatus of claim 6 wherein the first and second support members are composed of the same foam material as the first and second foam portions.

8. The apparatus of claim 1 wherein each first segment and each second segment is configured to move independently of and relative to the other first and second segments.

9. The apparatus of claim 1 wherein:
- the first foam portion has a beveled cross-sectional shape; and
- the second foam portion has a beveled cross-sectional shape.

10. An elongate, compressible head member for use with a loading dock seal, wherein the head member is configured to extend horizontally adjacent to an upper portion of an opening in a building between first and second side members, and wherein the compressible head member comprises:
- an elongate, generally rigid support member having a front side and a back side, wherein the back side of the support member abuts a wall of a building adjacent to the opening when installed;
- a plurality of individual fingers having front faces and back faces, wherein the back faces of the individual fingers are fixedly attached to the front side of the support member and the front faces of the individual fingers project away from the front side of the support member, and wherein the individual fingers are separated and spaced apart from each other and are composed of a resilient, compressible material; and
- a fabric portion in direct contact with and covering the front faces of the individual fingers projecting away from the front side of the support member.

11. The compressible head member of claim 10 wherein each finger is positioned to move independently of and relative to the other fingers of the head member.

12. The compressible head member of claim 10 wherein the front face portions of each finger are approximately co-planar with each other.

13. The compressible head member of claim 10 wherein the front faces and the back faces of the individual fingers have the same cross-sectional dimension.

* * * * *